United States Patent
Abe et al.

(10) Patent No.: US 10,101,743 B2
(45) Date of Patent: Oct. 16, 2018

(54) VEHICLE CONTROL SYSTEM, VEHICLE CONTROL METHOD AND VEHICLE CONTROL PROGRAM

(71) Applicant: Honda Motor Co., Ltd., Tokyo (JP)

(72) Inventors: Masaaki Abe, Saitama (JP); Kunimichi Hatano, Saitama (JP); Masahiko Asakura, Saitama (JP); Naoto Sen, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/437,442

(22) Filed: Feb. 21, 2017

(65) Prior Publication Data

US 2017/0261983 A1 Sep. 14, 2017

(30) Foreign Application Priority Data

Mar. 14, 2016 (JP) ................................. 2016-050166

(51) Int. Cl.
  *G05D 1/00* (2006.01)
  *G05D 1/02* (2006.01)
  (Continued)

(52) U.S. Cl.
  CPC ......... *G05D 1/0061* (2013.01); *B60W 50/082* (2013.01); *G05D 1/0088* (2013.01);
  (Continued)

(58) Field of Classification Search
  CPC .... G05D 1/0061; G05D 1/0088; G05D 1/021; G05D 1/0223; G05D 1/0212; B60W 50/082; B60W 30/12
  See application file for complete search history.

(56) References Cited

U.S. PATENT DOCUMENTS

2014/0156182 A1* 6/2014 Nemec et al. ......... G05D 1/021
  701/430
2014/0297090 A1* 10/2014 Ichinose .............. G05D 1/0246
  701/23

(Continued)

FOREIGN PATENT DOCUMENTS

JP   2008290680   12/2008
JP   2015162175    9/2015

(Continued)

OTHER PUBLICATIONS

"Office Action of Japan Counterpart Application," with machine English translation thereof, dated Aug. 15, 2017, p. 1-p. 11.

*Primary Examiner* — Dale W Hilgendorf
(74) *Attorney, Agent, or Firm* — JCIPRNET

(57) ABSTRACT

The present invention aims to inhibit the complexity caused to a vehicle passenger when automatic driving is started. A vehicle control system comprises a recognizing part, recognizing the position and surroundings of a vehicle per se; and a control part, automatically controlling the automatic driving of at least one of acceleration and deceleration and steering of the vehicle per se, and determining whether a starting condition containing that the vehicle per se has passed by a preset passing location is met by referring to the position and surroundings of the vehicle per se recognized by the recognizing part, and starting the automatic driving when determining that the starting condition is met.

18 Claims, 11 Drawing Sheets

(51) Int. Cl.
*B60W 50/08* (2012.01)
*B60W 30/12* (2006.01)
*B60W 50/00* (2006.01)

(52) U.S. Cl.
CPC .......... *G05D 1/021* (2013.01); *G05D 1/0212* (2013.01); *G05D 1/0223* (2013.01); *B60W 30/12* (2013.01); *B60W 50/00* (2013.01); *G05D 2201/0213* (2013.01)

(56) References Cited

U.S. PATENT DOCUMENTS

| | | | |
|---|---|---|---|
| 2015/0066282 A1* | 3/2015 | Yopp | G05D 1/0061 701/24 |
| 2015/0346724 A1* | 12/2015 | Jones et al. | G05D 1/0061 701/23 |
| 2016/0259334 A1* | 9/2016 | Hashimoto et al. | G05D 1/0061 |
| 2017/0106876 A1* | 4/2017 | Gordon et al. | G05D 1/0061 |

FOREIGN PATENT DOCUMENTS

| | | |
|---|---|---|
| JP | 2016504232 | 2/2016 |
| WO | 2016035486 | 3/2016 |

* cited by examiner

VEHICLE CONTROL SYSTEM, VEHICLE CONTROL METHOD AND VEHICLE CONTROL PROGRAM

This application claims the priority benefit of Japanese patent application no. 2016-050166, filed on Mar. 14, 2016. The entirety of the above-mentioned patent application is hereby incorporated by reference herein and made a part of this specification.

BACKGROUND OF THE INVENTION

1. Field of the Invention

The present invention relates to a vehicle control system, a vehicle control method and a vehicle control program.

2. Description of Related Art

Automatic driving positive propelling for automatically controlling at least one of acceleration and deceleration and steering of vehicles is researched. Relatively, there is disclosed a technology of switching from a manual driving mode to an automatic driving mode when tasks executed by a driver are all finished (for example referring to patent document 1).

EXISTING TECHNICAL DOCUMENTS

Patent Document

Patent document 1: Japanese Patent No. 2016-504232 gazette

SUMMARY OF THE INVENTION

However, in conventional technologies, operation for starting automatic driving is complex.

The present invention is finished in consideration of such situation, and one of its objectives is to inhibit the complexity caused to a vehicle passenger when the automatic driving is started.

Technical Means to Solve the Problem

The invention according to technical solution 1 is a vehicle control system, comprising a recognizing part, recognizing the position and surroundings of a vehicle per se; and a control part, automatically controlling the automatic driving of at least one of acceleration and deceleration and steering of the vehicle per se, and determining whether a starting condition containing that the vehicle per se has passed by a preset passing location is met by referring to the position and surroundings of the vehicle per se recognized by the recognizing part, and starting the automatic driving when determining that the starting condition is met.

The invention according to technical solution 2 is a vehicle control system according to technical solution 1, wherein the starting condition contains that the vehicle per se passes by preset multiple passing locations in sequence.

The invention according to technical solution 3 is the vehicle control system according to technical solution 1 or 2, which comprises a speed detecting part, detecting a speed of the vehicle per se, and the starting condition contains that the speed of the vehicle per se detected by the speed detecting part is faster than a set speed.

The invention according to technical solution 4 is the vehicle control system according to any one of technical solutions 1-3, which comprises an output part, outputting information, and the control part controls the output part to output the information representing the starting condition and/or a founding state of the starting condition.

The invention according to technical solution 5 is the vehicle control system according to any one of technical solutions 1-4, which comprises a proficiency speculating part, speculating a proficiency of the vehicle passenger who drives when the automatic driving is not performed, and the higher the proficiency speculated by the proficiency speculating part, the looser the starting condition set by the control part.

The invention according to technical solution 6 is the vehicle control system according to technical solution 5, which comprises an accepting part, accepting the operation of the vehicle passenger, and the proficiency speculating part speculates the proficiency of the vehicle passenger based on a reaction of the vehicle passenger when the vehicle passenger operates according to operation demands related to the automatic driving.

The invention according to technical solution 7 is the vehicle control system according to technical solution 5 or 6, wherein the proficiency speculating part speculates the proficiency of the vehicle passenger based on the times of automatic driving by the control part.

The invention according to technical solution 8 is the vehicle control system according to any one of technical solutions 1-7, wherein the control part starts the automatic driving based on a fact whether the starting condition is met when a destination to be reached by the vehicle per se is set.

The invention according to technical solution 9 is the vehicle control system according to any one of technical solutions 1-8, which comprises an accepting part, accepting the operation of the vehicle passenger, and the control part starts the automatic driving based on a fact whether the starting condition is met when the accepting part allows the operation of starting the automatic driving based on the fact whether the starting condition is met.

The invention according to technical solution 10 is the vehicle control system according to technical solution 9, which comprises an output part, outputting information, and the accepting part accepts the operation that the vehicle passenger sets a destination, and the control part controls the output part to output information inquiring whether the automatic drive is allowed to be started based on a fact whether the starting condition is met when the accepting part accepts the operation of setting the destination.

The invention according to technical solution 11 is the vehicle control system according to any one of technical solutions 1-10, which comprises an accepting part accepting the operation of the vehicle passenger, and the control part changes the starting condition when the accepting part performs the operation of changing the starting condition.

The invention according to technical solution 12 is a vehicle control method, which controls a vehicle-mounted computer to recognize the position and surroundings of a vehicle per se, determine whether a starting condition containing that the vehicle per se has passed by a preset passing location is met based on the recognized position and surroundings of the vehicle per se, and start the automatic driving of at least one of the acceleration and deceleration and steering when determining that the starting condition is met.

The invention according to technical solution 13 is a vehicle control program, which controls a vehicle-mounted computer to recognize the position and surroundings of a vehicle per se, determine whether a starting condition containing that the vehicle per se has passed by a preset passing location is met based on the recognized position and surroundings of the vehicle per se, and start the automatic driving of at least one of the acceleration and deceleration and steering when determining that the starting condition is met.

Invention Effects

According to the invention of technical solutions 1-3 and 8-13, whether a starting condition containing that the vehicle per se has passed by a preset passing location is met is determined, if the starting condition is determined to be met, then the automatic driving is started, therefore, the complexity caused to the vehicle passenger when the automatic driving is started can be inhibited.

According to the invention of technical solution 4, the output part is caused to output the information representing the starting condition and/or a founding state of the starting condition, such that a user is endowed with a relief.

According to the invention according to technical solutions 5-7, the higher the proficiency speculated by the proficiency speculating part, the looser the starting condition, such that the starting condition corresponding to the proficiency can be set.

DESCRIPTION OF THE EMBODIMENTS

Hereinafter, the vehicle control system, vehicle control method and vehicle control program of the present invention are explained by referring to drawings.

Figure 1:
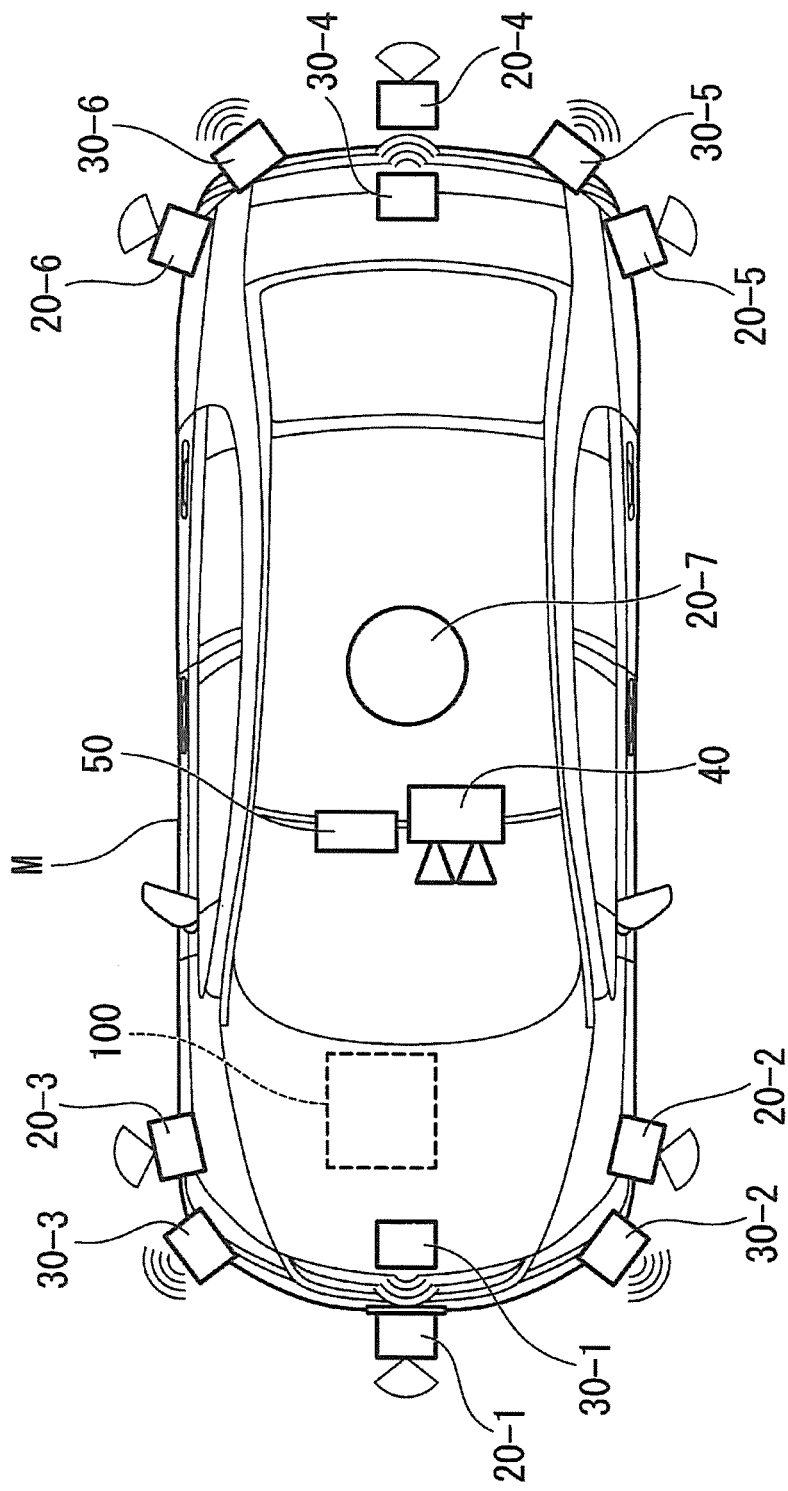
FIG. 1 is a diagram illustrating constituting elements of a vehicle M per se.

FIG. 1 is a diagram illustrating constituting elements of a vehicle (called as vehicle M per se hereinafter) carrying a vehicle control system 100 of each embodiment. The vehicle carrying the vehicle control system 100 for example is a two-wheel or three-wheel and four-wheel vehicle, and comprises a vehicle taking a diesel engine or gasoline engine as an internal combustion engine as a power source, an electric vehicle taking an electromotor as a power source, a hybrid vehicle having both the internal combustion engine and the electromotor, etc. The electric vehicle for example is driven by electricity released from a secondary battery, a hydrogen fuel battery, a metal fuel battery, an alcohol fuel battery and other batteries.

As shown in FIG. 1, the vehicle M per se carries sensors such as finders 20-1 to 20-7, radars 30-1 to 30-6, a camera 40, a navigation device 50 and a vehicle control system 100.

The finders 20-1 to 20-7 for example detect the scattering light relative to irradiating light, so as to detect a distance from LIDAR (Light Detection and Ranging) or Laser Imaging Detection and Ranging to an object. For example, the finder 20-1 is mounted on a front grill, etc., the finder 20-2 and finder 20-3 are mounted on a side surface or door mirror, inside a headlamp or nearby a side lamp, etc. The finder 20-4 is mounted on a trunk lid, etc., and the finder 20-5 and the finder 20-6 are mounted at the side surface of a vehicle body or inside a taillight, etc. The finders 20-1 to 20-6 for example have a detection region of about 150 degrees in the horizontal direction. Besides, the finder 20-7 is mounted on a vehicle roof, etc. The finder 20-7 for example has a detection region of 360 degrees in the horizontal direction.

The radar 30-1 and radar 30-4 for example are long distance millimeter wave radars of which the detection region in a longitudinal direction is longer than other radars. Besides, the radars 30-2, 30-3, 30-5 and 30-6 are middle distance millimeter wave radars of which the detection region is shorter than the radars 30-1 and radar 30-4.

Hereinafter, under the condition of not being particularly distinguished, the finders 20-1 and 20-7 are short for "finder 20", under the condition of not being particularly distinguished, the radars 30-1 to 30-6 are short for radar 30. The radar 30 for example detects an object in a Frequency Modulated Continuous Wave (FM-CW) manner.

The camera 40 for example uses a digital camera using a single [solid] camera element such as a Charged Coupled Device (CCD) or Complementary Metal Oxide Semiconductor (CMOS). The camera 40 is mounted on the upper part of a front windshield or on the back surface of a vehicle room mirror. The camera 40 for example periodically repeatedly shoots a position in front of the vehicle M per se. The camera 40 can be also a stereocamera containing multiple cameras.

In addition, the constitution as shown in FIG. 1 is only an example, that is, part of the constitution can be omitted or other constitutions can be further added.

Figure 2:
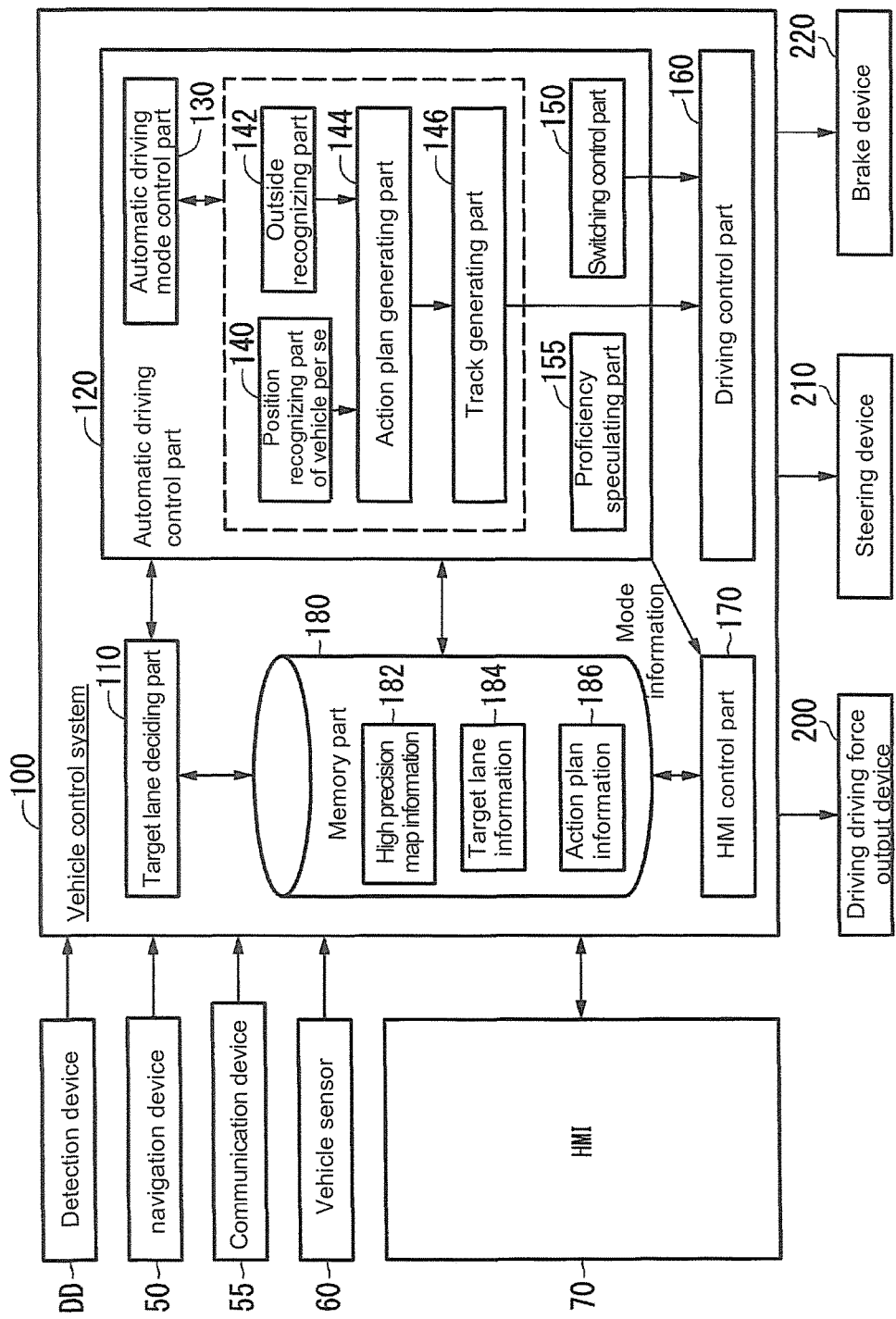
FIG. 2 is a function constituting diagram taking a vehicle control system 100 as a center and is a function constituting diagram of the vehicle M per se.

FIG. 2 is a function constituting diagram taking the vehicle control system 100 of the embodiment as a center. The vehicle M per se carries a detection device (DD) containing a finder 20, a radar 30, a camera 40, etc., a navigation device 50, a communication device 55, a vehicle sensor 60, a Human Machine Interface (HMI) 70, a vehicle control system 100, a driving driving force output device 200, a steering device 210 and a brake device 220. These devices or equipments are connected to one another by a multiplexing communication line such as a Controller Area Network (CAN), or a serial communication line, a wireless communication network, etc. In addition, the vehicle control system in claims is not only referred to "the vehicle control system 100", but also comprises the constitution (finder DD or HMI 70) except for "vehicle control system 100".

The navigation system 50 has a Global Navigation Satellite System (GNSS) receiver or map information (navigation map), a touch panel display device playing a role as a user interface, a speaker, a microphone, etc. The navigation device 50 determines the position of the vehicle M per se by the GNSS receiver, and derives a path from such position to a destination designated by the user. The path derived from the navigation device 50 is provided for a target lane deciding part 110 of the vehicle control system 100. The position of the vehicle M per se is also determined or replenished by an Inertia Navigation System (INS) output by the vehicle sensor 60. Besides, the path to the destination is guided by the navigation device 50 when the vehicle control system 100 executes a manual driving mode through a sound or navigation display. In addition, the constitution for determining the position of the vehicle M per se can also be disposed independent from the navigation device 50. Besides, the navigation device 50 for example can be realized by a function of a terminal device such as a smartphone or tablet terminal held by a user. At this point, the terminal device and the vehicle control system 100 perform information transceiving based on wireless or wired communication.

The communication device 55 for example performs wireless communication such as a cellular net or Wireless Fidelity (Wi-Fi™) net, Bluetooth (registered trademark), and Dedicated Short Range Communication (DSRC), etc.

The vehicle sensor 60 contains a vehicle speed sensor detecting a vehicle speed, an acceleration sensor detecting an accelerated speed, a yaw rate sensor detecting an angular speed around a plumb axis, and a direction sensor detecting a direction of the vehicle M per se, etc.

Figure 3:
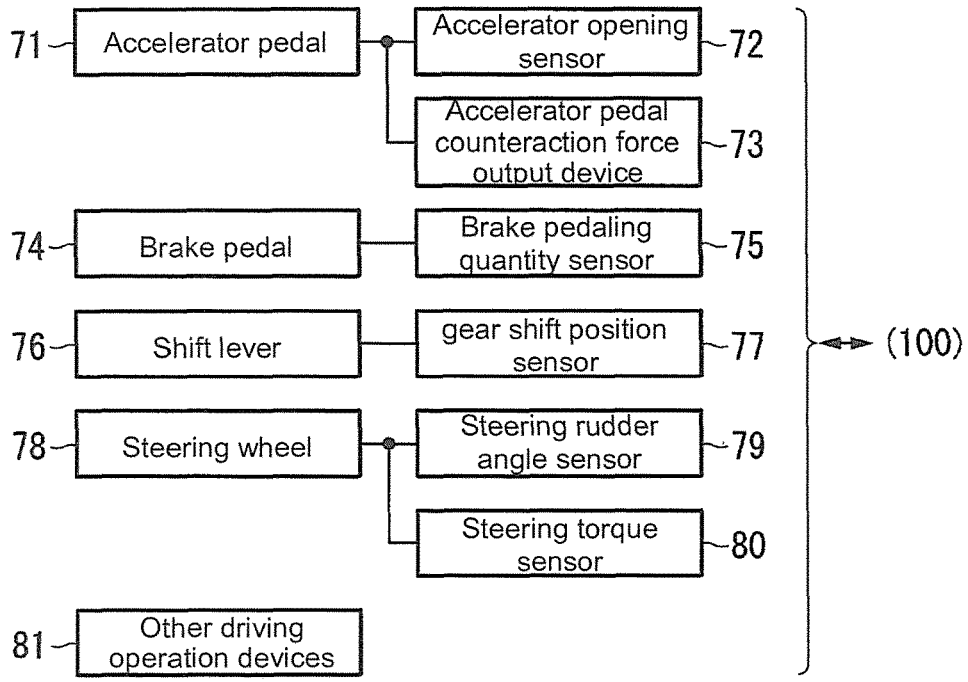
FIG. 3 is a constituting diagram of a Human Machine Interface (HMI) 70.
Figure 3:
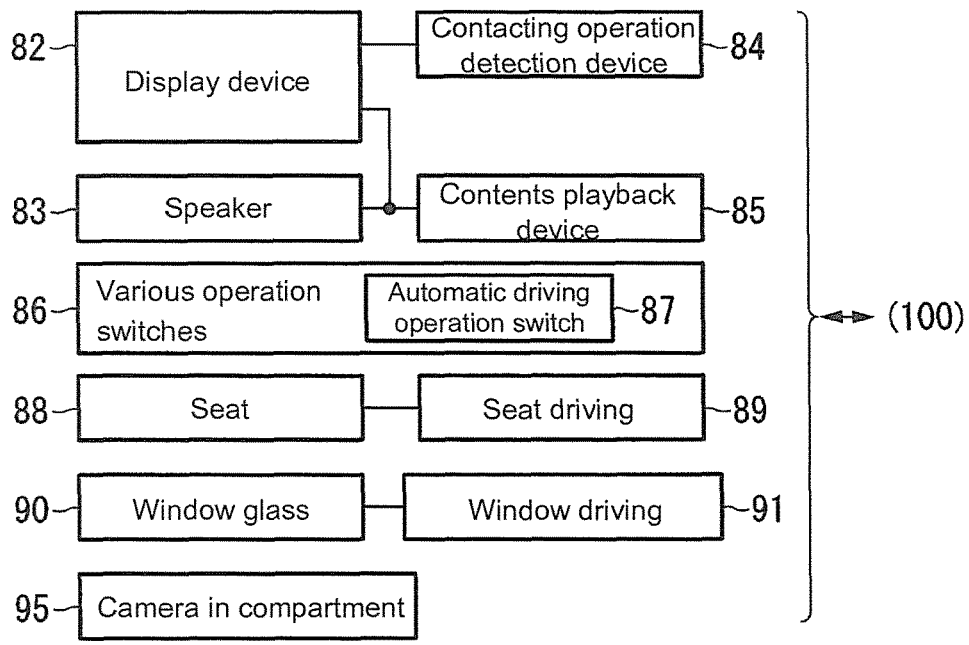

FIG. 3 is a constitution diagram of HMI 70. The HMI 70 for example has a constitution of a driving operation system and a constitution of a non-driving operation system. Their boundaries are not clear, and the constitution of the driving operation system can also has the function of the non-driving operation system (or not).

As a constitution of the driving operation system, the HMI 70 for example contains an accelerator pedal 71, an acceleration opening sensor 72, an accelerator pedal counteraction force output device 73, a brake pedal 74, a brake pedalling quantity sensor (or main pressure sensor, etc.) 75, a shift lever 76, a gear shift position sensor 77, a steering wheel 78, a steering rudder angle sensor 79, a steering torque sensor 80 and other driving operation devices 81.

The accelerator pedal 71 is an operation device used for accepting an acceleration indication (or deceleration indication based on a recovery operation). The acceleration opening sensor 72 detects a pedalling quantity of the accelerator pedal 71, and outputs an accelerator opening signal expressing the pedalling quantity. In addition, the output to the vehicle control system 100 can be replaced with the direct output to the driving driving force output device 200, the steering device 210 or the brake device 220. The constitution of other driving operation systems explained hereinafter is also the same. The accelerator pedal counteraction force output device 73, for example according to the indication from the vehicle control system 100, outputs a force (operation counteraction force) in a direction opposite to an operation direction relative to the accelerator pedal 71 to the vehicle control system 100.

The brake pedal 74 is an operation device used for accepting a deceleration indication of the vehicle passenger. The brake pedalling quantity sensor 75 detects the pedalling quantity (or pedalling force) of the brake pedal 74, and outputs a brake signal expressing a detection result to the vehicle control system 100.

The gear lever 76 is an operation device used for accepting a change indication for the change indication of the vehicle passenger. The gear shift position sensor 77 detects a gear indicated by the vehicle passenger and outputs a gear signal expressing the detection result to the vehicle control system 100.

The steering wheel 78 is an operation device for accepting a returning indication of the vehicle passenger. The steering rudder angle sensor 79 detects an operation angle of the steering wheel 78 and outputs a steering rudder signal expressing the detection result to the vehicle control system 100. The steering torque sensor 80 detects a torque applied to the steering wheel 78 and outputs a signal expressing a steering torque signal of the detection result to the vehicle control system 100.

Other driving operation devices 81 comprise such as a joystick, a button, a dial switch, a Graphic user Interface (GUI) switch, etc. Other driving operation devices 81 accept the acceleration indication, the deceleration indication, the returning indication, etc., and outputs the vehicle control system 100.

As the constitution of the non-driving operation system, the HMI 70 for example contains a display device 82, a speaker 83, a contacting operation detection device 84 and a contents playback display device 85, various operation switches 86, a seat 88, a seat driving device 89, window glass 90 and a window driving device 91.

The display device 82 for example is a Liquid Crystal Display (LCD) or Electroluminescence (EL) display device, etc., mounted on each part of an instrument panel, a co-passenger seat or any position opposite to a rear seat. Besides, the display device 82 can be a Head Up Display (HUD) projecting an image to the front windshield or other windows. The speaker 83 outputs a sound. The contacting operation detection device 84 detects a contacting position (touch position) on a display picture of the detection device 82 under a condition that the display device 82 is a touch screen and outputs to the vehicle control system 100. In addition, under the condition that the display device 82 is a non-ouch display screen, the contacting operation detection device 84 can be omitted.

The contents playback device 85 for example contains a Digital Versatile Disc (DVD), a playback device, a Compact Disc (CD) playback device, a television receiver, a generation device of various guide devices, etc. Part or all of the display device 82, the speaker 83, the contacting operation detection device 84 and the contents playback device 85 can also be a constitution shared with the navigation device 50.

Respective operation switches 86 are configured in any positions in a compartment and contain an automatic driving switching switch 87 indicating starting (or starting in the future) and stopping of the automatic driving. The automatic driving switching switch 87 is any one of a GUI (Graphic User Interface) switch and a mechanical switch. Besides, the respective operation switches 86 can also contain a switch for driving the seat driving device 89 or the window driving device 91.

The seat 88 is a seat seated by the vehicle passenger. The seat driving device 89 is for example disposed on each vehicle door from a reclining angle, a front and back direction position, a deflection angle, etc., driving the seat 88. The window glass 90 driving device 91 opens, closes and drives the window glass 90.

The camera 95 in the compartment is a digital camera using a single [solid] camera element such as a CCD or CMOS. The camera 95 in the compartment is mounted in a position where at least the head of the vehicle passenger who drives can be shot, such as a back mirror or a steering boss part, an instrument panel, etc. The camera 40 for example periodically repeatedly shoots the vehicle passenger.

Before the vehicle control system 100 is explained, the driving driving force output device 200, the steering device 210 and the brake device 220 are explained.

The driving driving force output device 200 is used for outputting a driving driving force (torque) for the vehicle to driving wheels. The driving driving force output device 200 for example has an engine, a transmission and an engine Electronic Control Unit (ECU) controlling the engine when the vehicle M per se is a vehicle taking the internal combustion engine as a power source, has a motor for driving and a motor ECU controlling the motor for driving when the vehicle M per se is an electric vehicle taking the electromotor as a power source and has an engine, a transmission, an engine ECU, a motor for driving and a motor ECU when the vehicle M per se is a hybrid vehicle. Under the condition that the driving driving force output device 200 only contains the engine, the engine ECU adjusts a throttle opening or gear according to information input from a later driving control part 160. Under the condition that the driving driving force output device 200 only comprises the motor for driving, the motor ECU adjusts a duty ratio of a Pulse Width Modulation (PWM) signal given to the motor for driving according to the information input from the driving control part 160. Under the condition that driving driving force output device 200 only comprises the engine and the motor for driving, the engine ECU and the motor ECU control a driving driving force harmonically according to the information input from the driving control part 160.

The steering device 210 for example has a steering ECU and an electromotor. The electromotor for example changes the direction of a steering wheel by acting a force on a rack and pinion mechanism. The steering ECU drives the electromotor according to the information input from the vehicle control system 100 or input steering rudder angle or steering torque information so as to change a direction of the steering direction.

The brake device 220 for example is an electric servo rake device having a brake calliper, a cylinder transmitting a hydraulic pressure to the brake calliper, an electromotor enabling the cylinder to generate the hydraulic pressure and a brake control part. The brake control part of the electric servo brake device controls the electromotor according to the information input from the driving control part 160 so as to output a brake torque corresponding the brake operation to each wheel. The electric servo brake device has a mechanism transmitting the hydraulic pressure generated by the operation of the brake pedal to the cylinder through a master cylinder as a backup. In addition, the brake device 220 is not limited to the explained electric servo brake device and can also be an electronic control type hydraulic brake device. The electronic control type hydraulic brake device controls an actuator according to the information input from the driving control part 160 to transmit the hydraulic pressure of the master cylinder to the cylinder. Besides, the brake device 220 can also contain a regeneration brake, which uses the motor for driving contained in the driving driving force output device 200.

[Vehicle Control System]

The vehicle control system 100 is explained hereinafter. The vehicle control system 100 for example is realized by more than one processor or hardware having the same functions. The vehicle control system 100 can be a constitution formed by constituting processor such as a Central Processing Unit (CPU), an ECU (electronic Control unit) formed by connecting a memory device and a communication port through an internal bus or a Micro-Processing Unit (MPU).

Back to FIG. 2, the vehicle control system 100 for example has a target lane deciding part 110, an automatic driving control part 120, a driving control part 160 and a memory part 180. The automatic driving control part 120 for example has an automatic driving mode control part 130, a position recognizing part 140 of the vehicle per se, an outside recognizing part 142, an action plan generating part 144, a track generation part 146, a switching control part 150 and a proficiency speculating part 155. Each part in the target lane deciding part 110, the automatic driving control part 120 and part or all of the driving control part 160 can be realized by hardware such as a Large Scale Integration (LSI) or an Application Specific Integrated Circuit (ASIC), and can also be realized by combining software with hardware.

In the memory part 180, for example, stores information such as high precision map information 182, target lane information 184, action plan information 186, etc. The memory part 180 is realized by using a Read Only Memory (ROM) or a Random Access Memory (RAM), a Hard Disc Drive (HDD), a flash memory, etc. A program executed by the processor can be prestored in the memory part 180 and can also be downloaded from an external device through a vehicle-mounted international Internet device, etc. Besides, the program can also be installed in the memory part 180 by mounting a portable memory medium storing such program into an unshown drive device. Besides, the vehicle control system 100 can be dispersed through a plurality of computer devices.

The target lane deciding part 110 for example is realized by an MPU. The target lane deciding part 110 divides a path provided by the navigation device 50 into a plurality of blocks (for example, divided every 100 m about a vehicle advancing direction), and decides the target lane corresponding to each lane by referring to the high precision map information 182. The target lane deciding part 110 for example makes a decision of driving from which lane on the left. The target lane deciding part 110 for example decides the target lane in a manner that the vehicle M per se can be driven in a reasonable driving path advancing to a fork road under a condition that a fork road or converging part exists in the path. The target lane decided by the target lane deciding part 110 takes the decided target lane as the target lane information 184 to store in the memory part 180.

The high precision map information 182 is map information of which the precision is higher than that of a navigation map of the navigation device 50. The high precision map information 182 for example comprises central information of a lane, or boundary information of the lane. Besides the high precision map information 182 can contain road information, traffic limitation information, residence information (residence and post code), facility information, telephone number information, etc. The road information contains information expressing road variety such as an express way, toll road, national road and country road; or information such as a road lane number, a width of each lane, a slope of the road, road positions (three dimensional coordinates containing longitude, latitude and height), a curve curvature of the lane, a converging and fork point position of the lane, signs on the road, and the like. The traffic limitation information contains information that the lane is blocked due to construction or traffic accidents and congestion.

The automatic driving mode control part 130 decides modes of automatic driving executed by the automatic driving control part 120. The modes of the automatic driving in the present embodiment contain the following modes. In addition, the following modes are only an example, and the mode number of the automatic driving can be freely decided.

[First Mode]

The first mode is the mode with the highest automatic driving mode. When the first mode is executed, all vehicle control is performed automatically, for example, complex converging control, therefore, the vehicle passenger does not need to monitor the peripheral or state of the vehicle M per se.

[Second Mode]

The second mode is a mode of which the automatic driving degree is second to the first mode. When the second mode is executed, all vehicle control is performed automatically on principle, but according to a scenario, the driving operation of the vehicle M per se is relegated to the vehicle passenger. Therefore, the vehicle passenger must monitor the periphery or state of the vehicle M per se.

[Third Mode]

The third mode is a mode of which the automatic driving degree is second to the second mode. When the third mode is executed, the vehicle passenger must perform corresponding confirming operation corresponding to the scenario on the HMI 70. In the third mode, for example, the vehicle passenger is informed of the lane change timing, when the vehicle passenger performs operation of changing the lane on the HMI 70, automatic lane change is performed. Therefore, the vehicle passenger must monitor the periphery or state of the vehicle M per se.

The automatic driving mode control part 130 decides the automatic driving mode based on the operation of the vehicle passenger on the HMI 70, an event decided by the action plan generating part 144 and a driving form decided by the track generating part 146. The automatic driving mode is informed to the HMI control part 170. Besides, in the automatic driving mode, a boundary corresponding to the performances of the DD of the vehicle M per se can also be set. For example, if the performances of the DD are lower, then the first mode cannot be performed. Under any mode, the manual driving mode (override) can be switched specific to the operation of the constitution of the driving operation system in the HMI 70.

The position recognizing part 140 of the vehicle per se of the automatic driving control part 120 recognizes lane (driving lane) where the vehicle M per se is driven and a relative position of the vehicle M per se relative to the driving lane based on the high precision map information 182 stored in the memory part 180 and information input from the finder 20, the radar 30, the camera 40, the navigation device 50 or the vehicle sensor 60.

The position recognizing part 140 of the vehicle per se for example compares a graph (for example arrangement of solid line and virtual line) of a road division line recognized from the high precision map information 182 with that of the road division line of the periphery of the vehicle M per se recognized from an image shot by the camera 40, and thus recognizes the driving lane. In such recognizing, the position of the vehicle M per se obtained from the navigation device 50 or a processing result based on INS can also be considered.

Figure 4:
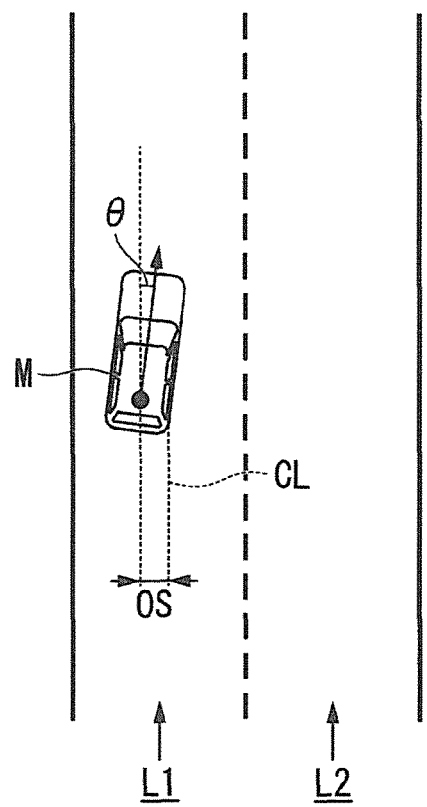
FIG. 4 is a diagram of a condition that a position recognizing part 140 of the vehicle per se recognizes a relative position of the vehicle M per se relative to a driving lane L1.

FIG. 4 is a diagram of condition that a position recognizing part 140 of the vehicle per se recognizes a relative position of the vehicle M per se relative to a driving lane L1. The position recognizing part 140 of the vehicle per se for example recognizes a deviation OS from a reference point (for example gravity center) of the vehicle M per se to the central CL of the driving lane and the angle θ between the advancing direction of the vehicle M per se relative to a line connected to the central CL of the driving lane as a relative position of the vehicle M per se relative to the driving lane L1. In addition, alternatively, the position recognizing part 140 of the vehicle per se recognizes the position of the reference point of the vehicle M per se relative of any side end part of the lane per se L1 as a relative position of the vehicle M per se relative to the driving lane. The relative position of the vehicle M per se recognized by the position recognizing part 140 per se is provided for the target lane deciding part 110.

The outside recognizing part 142 recognizes the position and speed, the acceleration and other states of peripheral vehicles based on the information input from the finder 20, the radar 30 and the camera 40. The so-called peripheral vehicles for example are vehicles driven at the periphery of the vehicle M per se and the vehicles driven in the direction same as the vehicle M per se. The positions of the peripheral vehicles can be represented by representing points such as the gravity center or corner of other vehicles and can also be repressed by a region expressed by the profiles of other vehicles. The "state" of the peripheral vehicles can also contain the acceleration of the peripheral vehicles and whether the lane change is being performed (or whether the lane change is about to be performed) learned based on the information of various devices. Besides, the outside recognizing part 142 can also recognize the positions of the a guardrail or a telegraph pole, a parked vehicle, a walker and other objects expect for the peripheral vehicles.

The action plan degenerating part 144 sets start location and/or a destination of the automatic driving. The start location of the automatic driving can be the current position of the vehicle M per se or a location where the automatic driving operation is performed. The action plan generating part 144 generates an action plan for an interval between the start location and the destination of the automatic driving. In addition, the action plan generating part 140 is not limited thereto and can generate an action plan at any interval.

The action plan contains multiple events executed in sequence. The events for example contain a deceleration event decelerating the vehicle M per se; or an acceleration event accelerating the vehicle M per se; a lane keep event driving the vehicle M per se in a manner of not deviating from the driving lane; a lane change event changing the driving lane; an overtaking event enabling the vehicle M per se to overtake a front vehicle; a fork event changing the required lane at a fork point or driving the vehicle M per se in a manner of not deviating from the current driving lane; a converging event accelerating and decelerating the vehicle M per se in a converging lane converged to a high street and changing the driving lane; and a handover event converting the manual driving mode to the automatic driving mode at the start location of automatic driving or converting the automatic driving mode to the automatic driving mode at an ending predicted location of the automatic driving. The action plan generating part 144 sets the lane change event, the fork event or the converging event in a position of switching the target lane decided by the target lane deciding part 110. The information expressing the action plan generated by the action plan generating part 144 is stored in the memory part 180 as the action plan information 186.

Figure 5:
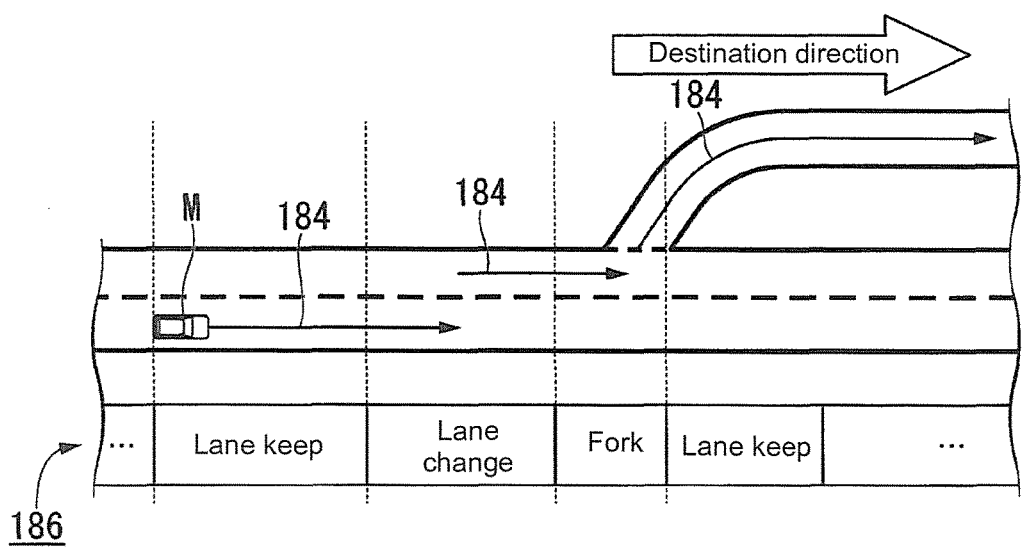
FIG. 5 is a diagram illustrating an example of an action plan generated in certain interval.

FIG. 5 is a diagram illustrating an example of an action plan generated at certain interval. As shown in the drawing, the action plan generating part 144 generates the action plan required by the driving of the vehicle M per se in the target lane as shown in the target lane information 184. In addition, the action plan generating part 144 can also dynamically change the action plan according to the condition of the vehicle M per se regardless of the target lane information 184. For example, when the speed of the peripheral vehicles recognized by the outside recognizing part 142 exceeds a threshold value or a moving direction of the peripheral vehicles driven on the lane adjacent to the lane per se faces the direction of the lane per se, the action plan generating part 144 changes the event of the vehicle M per se set at the preset driving interval. For example, if the event is set in a manner of executing the lane change event after the lane keep event, then when it is determined that the vehicle drives at a speed larger than the threshold value from a position behind the lane of the lane change target in the lane keep event according to a recognizing result of the outside recognizing part 142, the action plan generating part 144 can also change the next event of the lane keep event to the deceleration event or the lane keep event from the lane change event. As a result, the vehicle control system 100 can automatically drive the vehicle M per se safely even if under the condition that the outside state is changed.

Figure 6:
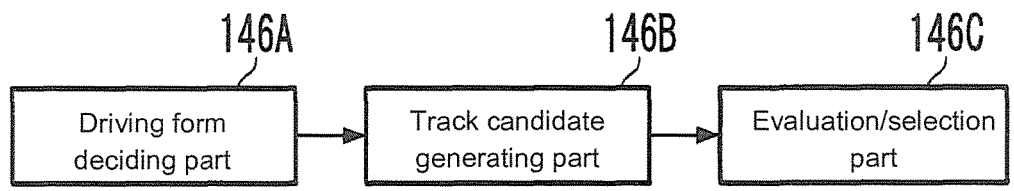
FIG. 6 is a diagram illustrating an example of constitution of a track generating part 146.

FIG. 6 is a diagram illustrating an example of constitution of a track generating part 146. The track generating part 146 for example has a driving form deciding part 146A, a track candidate generating part 146B and an evaluation/selection part 146C.

The driving form deciding part 146A for example decides any driving form of fixed speed driving, following driving, low speed following driving, deceleration driving, curve driving and obstacle avoiding driving during the lane keep event. For example, the driving form deciding part 146A decides the driving form to be fixed speed driving when there is no other vehicles in front of the vehicle per se M. Besides, the driving form deciding part 146A decides the driving form to be following driving when performing following driving is relative to a front vehicle. Besides, the driving form deciding part 146A decides the driving form to be low-speed following driving during a congestion scenario, etc. Besides, the driving form deciding part 146A decides the driving form to be fixed deceleration driving when the outside recognizing part 142 recognizes the deceleration of the front vehicle or the stopping or parking events are performed. Besides, the driving form deciding part 146A decides the driving form to be curve driving when the outside recognizing part 142 recognizes that the vehicle M per se is close to a curve. Besides, the driving form deciding part 146A decides the driving form to be obstacle avoiding driving when the outside recognizing part 142 recognizes that there is an obstacle in front of the vehicle M per se. Besides, the driving form deciding part 146A decides the driving form corresponding to each event when executing the lane change event, the overtaking event, the fork event, the converging event, the handover event and the like.

The track candidate generating part 146B generates a track candidate based on the driving form decided by the driving form deciding part 146A.

Figure 7:
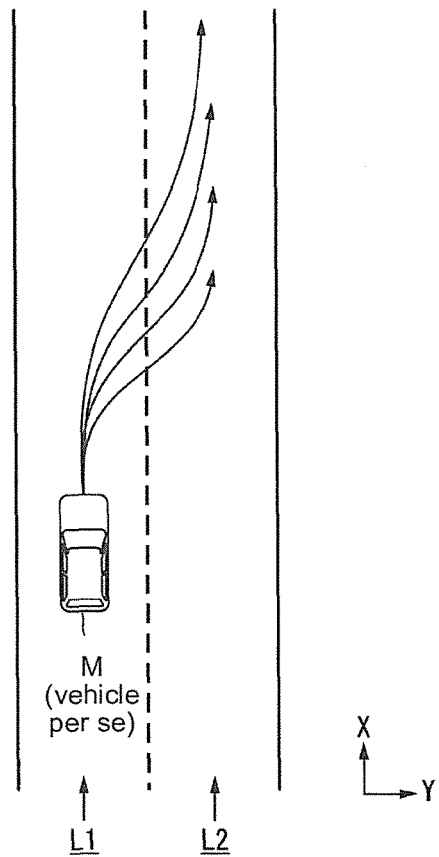
FIG. 7 is a diagram illustrating an example of a track candidate generated by a track candidate generating part 146B.

FIG. 7 is a diagram illustrating an example of a track candidate generated by a track candidate generating part 146B. FIG. 7 expresses the track candidate generated when the vehicle M per se changes the lane L1 to the lane L2.

Figure 8:
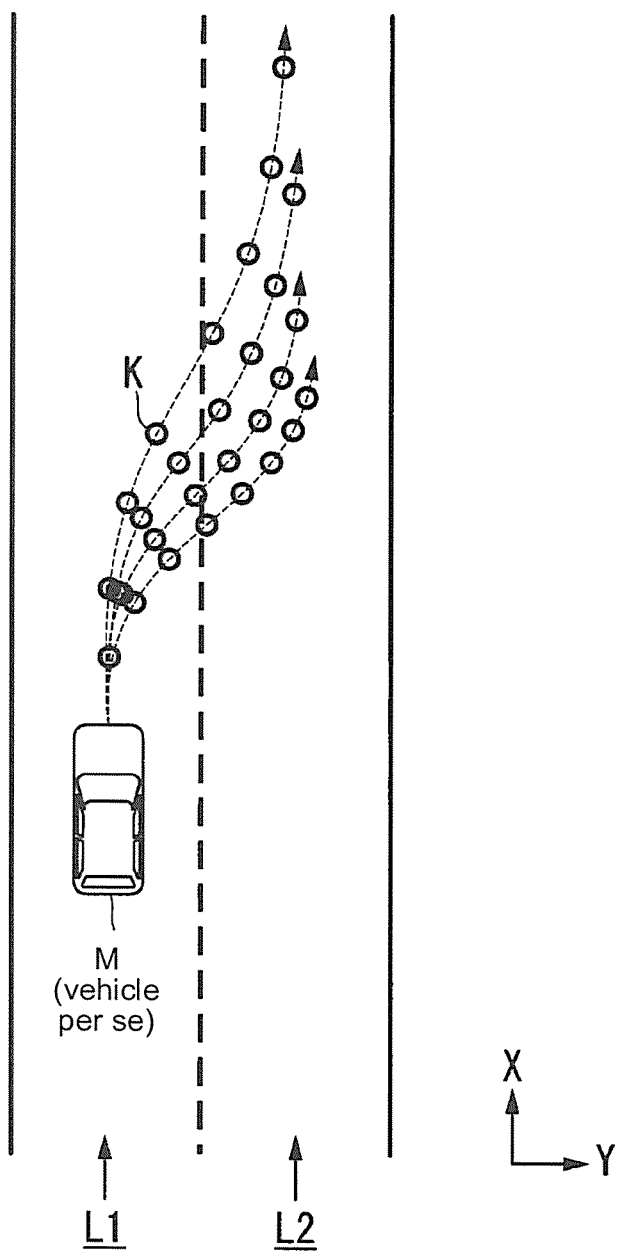
FIG. 8 is a diagram illustrating the track candidate generated by the track candidate generating part 146B with a track point K.

The track generating part 146 decides the track as shown in FIG. 7 to be for example a set of the target position (track point K) that the reference position (for example gravity center or rear wheel axis center) of the vehicle M per se should arrive at in each prescribed time in the future. FIG. 8 is a diagram illustrating the track candidate generated by the track candidate generating part 146B with a track point K. The wider the interval of the track point K, the faster the speed of the vehicle M per se, and the narrower the interval of the track point K, the slower the speed of the vehicle M per se. Therefore, when the track generating part 146 is about to accelerate, the interval of the track point K is widened gradually, and the interval of the track point is narrowed when the track generating part 146 is about to decelerate.

In this way, since the track point K contains a speed component, the track generating part 146 must give a target to the track point K. The target speed is decided by the driving form decided by the driving form deciding part 146A.

Figure 9:
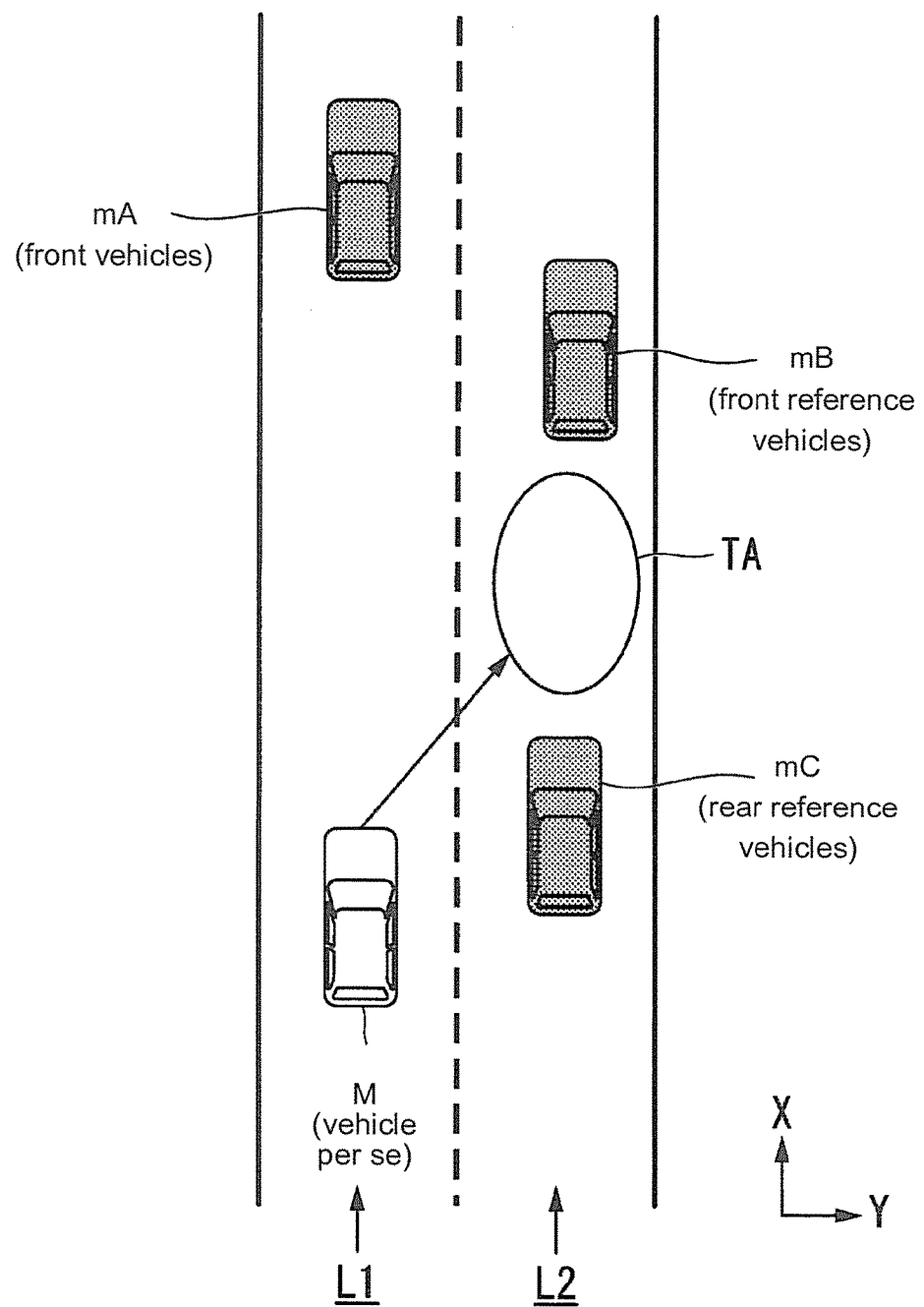
FIG. 9 is a diagram illustrating a lane change target position TA.

Herein, the method of deciding the target speed when the lane is changed (containing fork) is explained. The track generating part 146 firstly sets a lane change target position (or converge target position). The lane change target position is set as a relative position of the peripheral vehicles and "the lane is changed between which peripheral vehicles" is decided. The track generating part 146 focuses three peripheral vehicles by taking the lane change target position as a reference and decides the target speed during lane change. FIG. 9 is a diagram illustrating a lane change target position TA. In the drawing, L1 expresses a lane per se, and L2 is an adjacent lane. Herein, in the lane same as the vehicle M per se, the peripheral vehicles driven in right front of the vehicle M per se are defined as front vehicles mA, the peripheral vehicles driven in right front of the lane change target position TA are defined as front reference vehicles mB, and the peripheral vehicles driven right behind the lane change target position TA are defined as rear reference vehicles mC. The vehicle M per must be accelerated and decelerated in order to move to the position aside the lane change target position TA, but at this point, tailgating with the front vehicles mA must be avoided. Therefore, the track generating part 146 predicts a future state of three peripheral vehicles and decides the target speed in a manner of not interfering with the peripheral vehicles.

Figure 10:
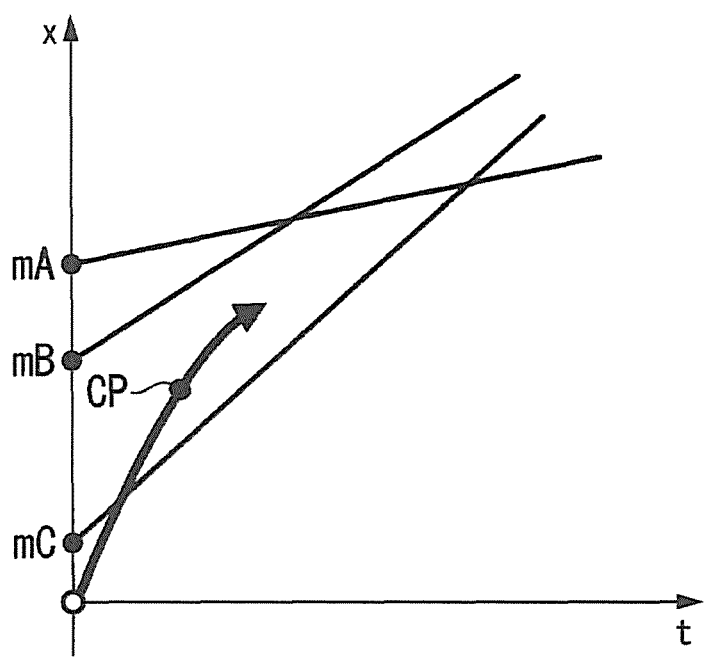
FIG. 10 is a diagram of a speed generating model when the speeds of three peripheral vehicles are assumed to be fixed.

FIG. 10 is a diagram of a speed generating model when the speeds of three peripheral vehicles are assumed to be fixed. In the drawing, the straight lines from mA, mB and mC express displacements in the advancing direction when each peripheral vehicle is driven at fixed speed. The vehicle M per se is located between the front reference vehicle mB and the rear reference vehicle mC at a point CP that the lane change is finished, and must be located behind the front vehicle mA before this. Under such limitation, the track generating part 146 derives multiple time sequence graphs of the target speed until the lane change is finished. Besides, by applying the time sequence graphs of the target speed to models such as a spline curve, multiple tract candidates as shown in FIG. 8 can be derived. In addition, motion graphs of the three peripheral vehicles are not limited to the fixed speed as shown in FIG. 10, and prediction can also be performed by taking a constant speed and a constant acceleration (jerk) as a premise.

The evaluation/selection part 146C evaluates based on two options of planning and safety of the track candidate generated by the track candidate generating part 146B so as to select the track output to the driving control part 160. According to the planning option, for example, if the following feature of the generated plan (for example action plan) is high and the whole length of the track is short, then the track evaluation is high. For example, under the condition of expecting to change the lane rightward, the evaluation on the track of temporarily changing the lane leftward and then returning is low. According to the option of safety, for example, in each track point, the farther the distance from the vehicle M per se to an object (peripheral vehicles, etc.) is, the smaller the variable of the acceleration and deceleration or rudder angle is, and then the higher the evaluation is.

The switching control part 150 is switched between the automatic driving mode and the manual driving mode based on the signal and the like input from the automatic driving switching switch 87. Besides, the switching control part 150 switches to the manual driving mode from the automatic driving mode based on the indication acceleration, deceleration or steering operation specific to the constitution of the driving operation system in the HMI 70. For example, the switching control part 150 switches to the manual driving mode (override) from the automatic driving mode when the state that an operation quantity shown by the signal input by the constitution of the driving operation system in the HMI 70 exceeds a threshold value lasts for more than reference time. Besides, the switching control part 150 can also restore the automatic driving mode when there is no operation specific to the constitution of the driving operation system in the HMI 70 being detected during the prescribed time after the override is switched to the manual driving mode 150.

[Starting Control of Automatic Driving]

The starting control of the automatic driving by the switching control part 150. The switching control part 150 also starts the automatic driving through the following method except for starting the automatic driving based on an operation for the automatic driving switching switch 87.

The switching control part 150 determines whether a starting condition containing that the vehicle per se has passed by a preset passing location is met by referring to the position and surroundings of the vehicle M, and the switching control part 150 enables the automatic driving control part 120 to start the automatic driving when determining that the starting condition is met. The starting condition is a condition used for causing the vehicle M per se to automatically start the automatic driving and contains that the vehicle M per se has passed by preset one or more passing locations, or the speed at the moment that the vehicle M per se finally passes by the location is set to be larger than a set speed. The number of the passing locations set by the starting condition or the position and setting speed of the passing locations can be fixedly set according to a starting position of the automatic driving, and can also be set based on the driving proficiency of the later vehicle passenger.

Figure 11:
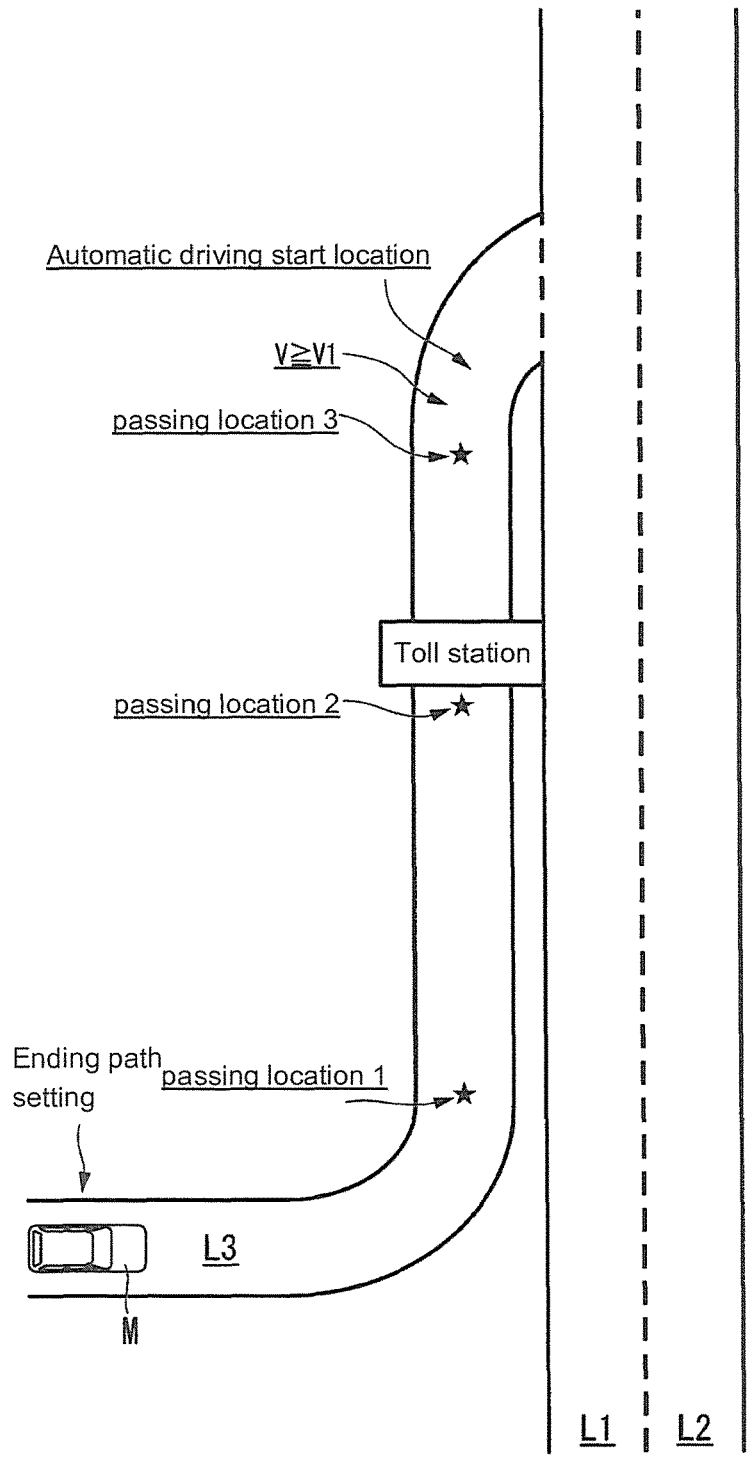
FIG. 11 is a diagram illustrating a starting condition.

FIG. 11 is a diagram illustrating the starting condition. In the vehicle M per se, it is set that the vehicle M per se is about to enter a converging lane L3 of the main street L1. In the vehicle M per se, the destination to which the vehicle M is about to reach and a path to the destination are set. The switching control part 150 derives (or reads) an interval (automatic driving interval) in which the automatic driving can be executed from the high precision map information 182 when deciding the path to the destination. The start location of the automatic driving as shown in the drawing is set nearby a start point of the automatic driving interval.

Besides, the switching control part 150 stores corresponding information of a corresponding relation of the start location and passing location of the automatic driving in the memory part 180. The corresponding information is not limited to the information (for example coordinates) directly designating the passing location, and can be information expressing "rules" such as "a location after a toll station by 500 [m], a location in front of a toll station by 10 [m] and a location in front of a toll station by 300 [m]". Besides, the corresponding information can be part of the high precision map information 182. The switching control part 150 reads the information of the passing location from the memory part 180 (or decides the passing location according to the "rules") when deciding the automatic driving starting location and contains it within the starting condition. In the example of FIG. 11, when the vehicle M per se passes by the passing location 1 to the passing location 3 in sequence and at the moment when passing by the passing location 3, a speed V of the vehicle M per se is set to be larger than a set speed V1, and the switching control part 150 automatically starts the automatic driving. The confirmation that the passing location has been passed is performed by comparing the position of the vehicle M per se input from the navigation device 50 and the high precision map information 182.

Besides, the passing location set before the automatic driving start location, for example, can be set by the operation of the vehicle passenger for the HMI 70 when the path is set. In this way, the automatic driving can be started at the moment liked by the vehicle passenger.

Figure 12:
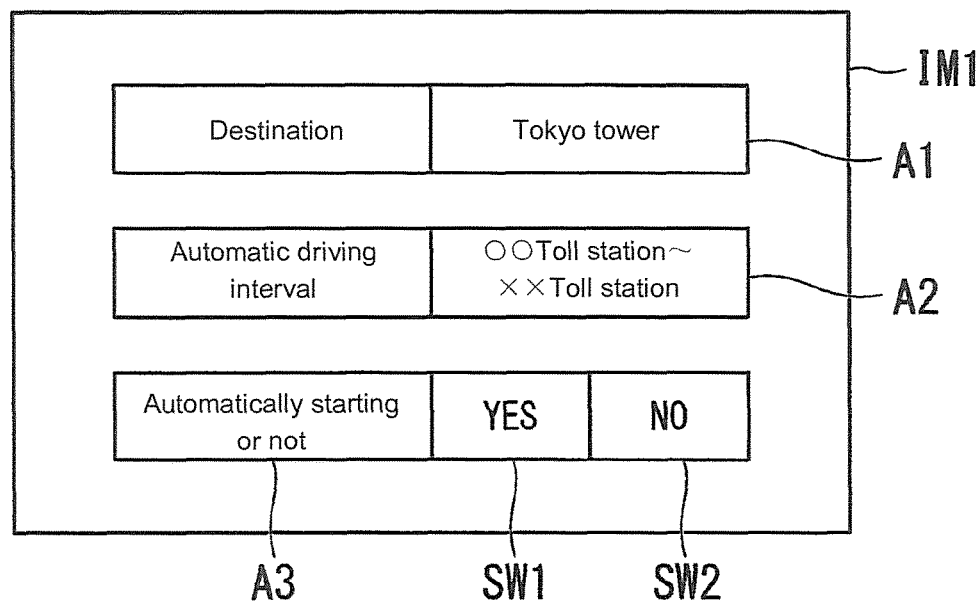
FIG. 12 is a diagram illustrating an example of an interface image IM1 displayed on a display device 82 when a path of the vehicle M per se is set.

Besides, the switching control part 150 cooperates with the navigation device 50 for the following processing. When the switching control part 150 sets the destination, an interface image IM for inquiring whether the automatic driving is started is displayed on the display device 82. FIG. 12 is a diagram illustrating an example of the interface image IM1 displayed on a display device 82 when a path of the vehicle M per se is set. The interface image IM1 contains a destination display region A1 displaying a destination set by a user and an automatic driving interval display region A2 displaying the automatic driving interval.

An interface image IM1 contains an inquiring image display region A3, and the inquiring image display region A3 is used for inquiring whether the automatic driving is allowed to be started when the starting condition is met. Besides, on the interface image IM2, a GUI switch SW1 and a GUI switch SW2 accepting the inquired operation input are set. The GUI switch SW1 is a switch accepting that the automatic driving is allowed to be automatically started and the GUI switch SW2 is a switch accepting that the automatic driving is not allowed to be automatically started.

For example, the switching control part 150 automatically starts the automatic driving when the GUI switch SW1 accepts the operation input and the starting condition is met, and starts the automatic driving only through manual operation when accepting the operation input of the GUI switch SW2.

Figure 13:
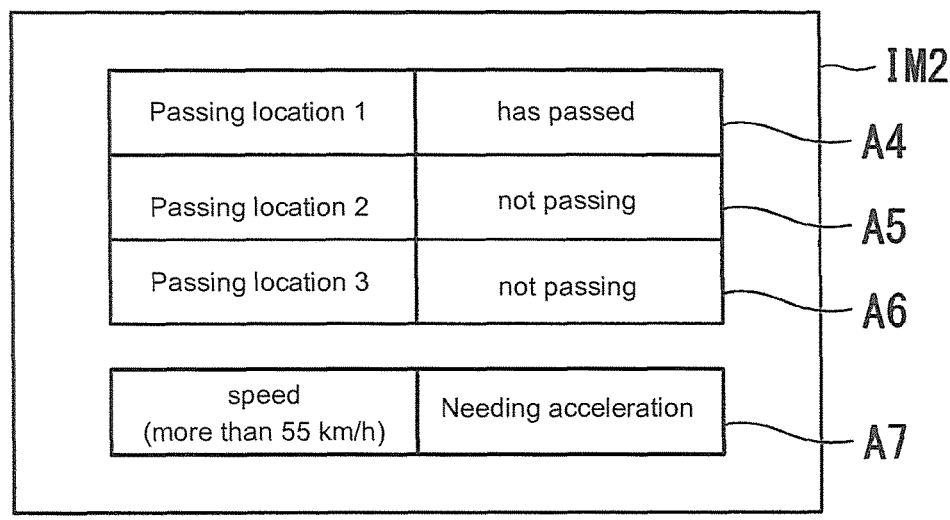
FIG. 13 is a diagram illustrating an example of an interface image IM2, and the interface image IM2 represents a founding state of the starting condition of automatic driving.

Besides, the switching control part 150 displays the condition causing the automatic driving to automatically start and/or the information expressing the founding state of the starting condition on the display device 82. FIG. 13 is a diagram illustrating an example of an interface image IM2, and the interface image IM2 represents the founding state of the starting condition of automatic driving. The so-called information expressing the founding state of the starting condition, for example, is the information expressing whether the vehicle M per se has passed by the preset passing location. The interface image IM2 for example contains a first passing state display region A4 expressing whether the vehicle M per se has passed by the preset passing location 1, a second passing state display region A5 expressing whether the vehicle M per se has passed by the preset passing location 2, and a third passing state display region A6 expressing whether the vehicle M per se has passed by the preset passing location 3. Besides, the interface image IM2 contains the information expressing the set sped V1 and a speed condition display region A7 expressing whether the speed of the vehicle M per se has reached the set speed V1. In the example of the drawing, the set speed V1 is 55 [km/h]. In the speed condition display region A7, for example, when the speed of the vehicle per se does not reach the set speed V1 yet, the information of "requiring acceleration" is displayed. In addition, such information can also be output through sound instead of display (or except for display.).

Besides, the switching control part 150 can also set the starting condition based on a proficiency speculated by the proficiency speculating part 155. For example, the higher the proficiency, the looser the starting condition set by the switching control part 150. For example, the switching control part 150 loosens the starting condition by reducing the number of the passing location as the starting condition, or setting the final passing location to the front side relative to the final passing location set by a person with lower proficiency. Besides, the switching control part 150 can also lower the set speed V1 to loosen the starting condition.

The proficiency speculating part 155 speculates the proficiency of the vehicle passenger (driver) who performs the manual operation under the manual driving mode. Specifically speaking, the proficiency speculating part 155 speculates the proficiency of the vehicle passenger based on the reaction made when the vehicle passenger operates specific to the operation requirements related to the automatic driving.

As an example of the operation requirements related to the automatic driving, there is a sound guidance output during a handover event from the automatic driving mode to the manual driving mode at the ending preset location of the automatic driving. The content of the sound guidance is contents such as "please hold the steering wheel" and the like. The proficiency speculating part 155 determines the time until the requested operation is executed after performing such operation request, so as to evaluate the "reaction" of the vehicle passenger. The shorter the determined time is, the higher the proficiency of the vehicle passenger is. In the example, after the sound guidance is output, the time until the steering wheel 78 is actually held is determined to evaluate the "reaction" of the vehicle passenger. The confirmation that the steering wheel 78 is held for example is performed by referring to the output of the steering torque sensor 80.

The speculation of the proficiency can be performed together with the recognition of figures of the vehicle passenger. The proficiency speculating part 155 for example can prestore a characteristic quantity of a face image in the memory part 180 and the like, can recognize individuals by comparing with the characteristic quantity of a face image of the vehicle passenger shot by the camera 95 in the compartment and speculates the proficiency specific to each person. Besides, the figure recognition based on the face image can also be replaced with the figure recognition based on bio-information such as fingerprints, vocal prints and irises.

Besides, the proficiency speculating part 155 can also speculate the proficiency of the vehicle passenger based on times of the automatic driving. The more the times of the automatic driving is, the higher the proficiency of the vehicle passenger speculated by the proficiency speculating part 155 is. This is because the more the times of the automatic driving, the more the automatic driving when the automatic driving mode is converted to the manual driving mode due to the handover event (or opposite).

Figure 14:
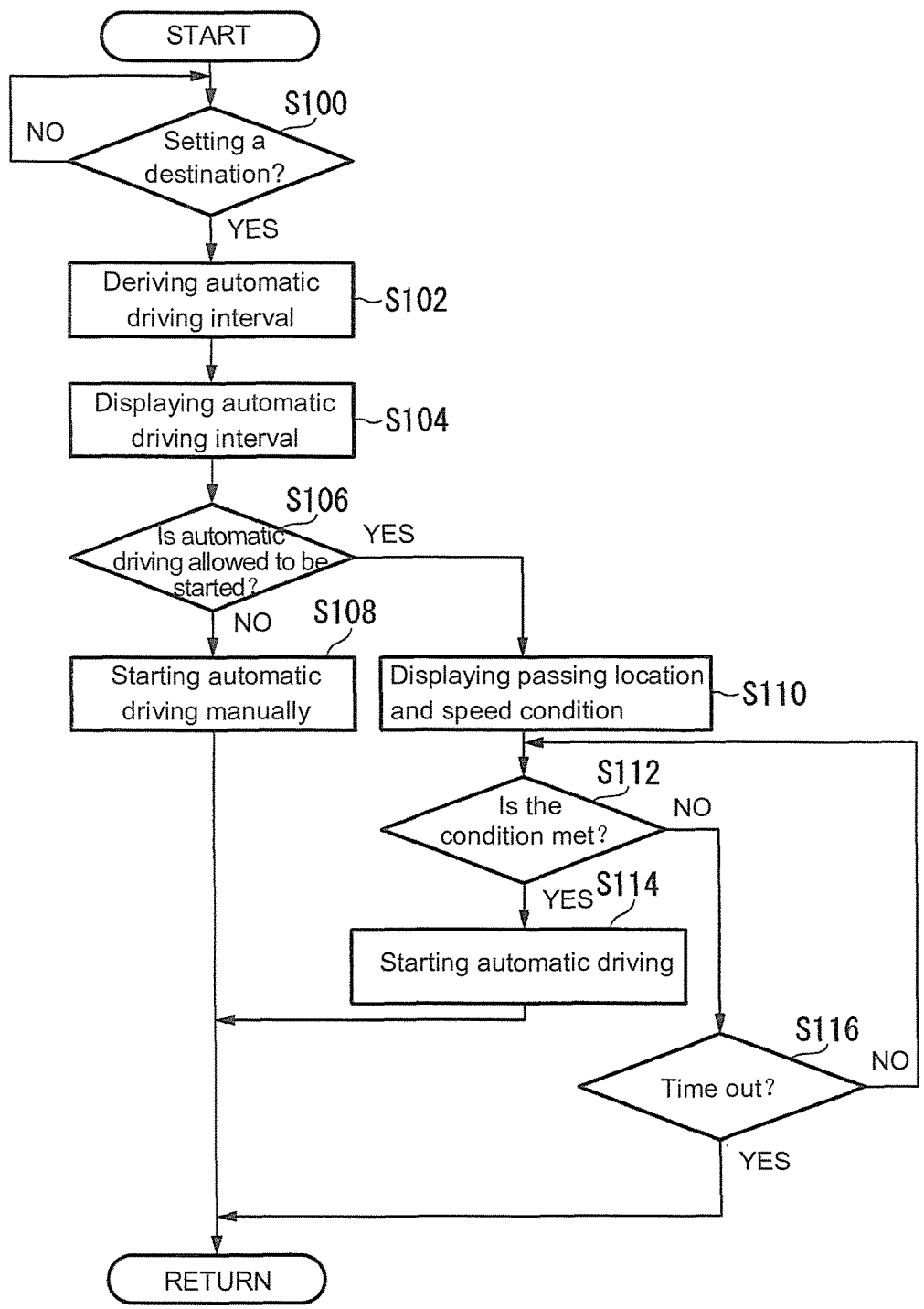
FIG. 14 is a flow chart illustrating a processing flow executed by a switching control part 150.

FIG. 14 is a flow chart illustrating a processing flow executed by a switching control part 150. The flow chart is executed by the modules related to automatic starting function of automatic driving contained in the switching control part 150.

At first, the module of the switching control part 150 stands by until that the user sets the destination to be reached in the vehicle M per se (S100). When the user set the destination of the automatic driving, the switching control part 150 derives the interval of the automatic driving based on the current position of the vehicle M per se and the destination of the set automatic driving (S102). Next, the switching control part 150 displays the information expressing the automatic driving interval derived from the step S102 on the display device 82 (step S104).

Next, the switching control part 150 determines whether the operation allowing the automatic driving to be automatically started is performed (S106). If the operation allowing the automatic driving to be automatically started is not performed, then the switching control part 150 starts the automatic driving according to the condition that the vehicle passenger operates the automatic driving switching switch 87 (S108).

If the operation allowing the automatic driving to be automatically started is performed, then the switching control part 150 displays the condition related to the passing location and the speed as the automatic driving starting condition on the display device 82 (step S110). Next, the switching control part 150 determines whether the starting condition is met (S112). If the starting condition is met, then the switching control part 150 controls the automatic driving control part 120 to start automatic driving (S114). If the starting condition is not met, then the switching control part 150 determines whether time is out (step 116). If the time is not out, then returning to the processing of S112, if the time is out, then the processing of the flow chart is ended. At this point, if the operation of resetting the destination or automatically starting the automatic driving is performed, then the processing below S106 is for example executed.

Through such control, the vehicle M per se can automatically start the automatic driving in an automatic driving start location. Therefore, the complexity caused to the vehicle passenger due to a fact that an extra operation is required when the automatic driving is started can be inhibited.

The driving control part 160 controls the driving driving force output device 200, the steering device 210 and the brake device 220 so as to cause the vehicle M per se to pass by the track generated by the track generating part 146 according to a preset moment.

The HMI control part 170 acquires the information output from the HMI 70 and the information output from the automatic driving control part 120 (for example mode information of the automatic driving), and limits the control of the automatic driving control part 120 based on the acquired information or outputs an indication value to the driving driving force output device 200 or steering device 210 and the brake device 220.

According to the embodiment explained above, whether a starting condition containing that the vehicle per se has passed by a preset passing location is met by referring to the position and surroundings of the vehicle per se, and the automatic driving is started if the starting condition is met, therefore, the complexity caused to the vehicle passenger when the automatic driving is started can be inhibited.

The above uses the embodiments to explain the form of the present invention, but the present invention is not limited to the present embodiment in any form, and various transformations and replacements can be made without departing from the range of a substance of the present invention.

What is claimed is:

1. A vehicle control system, comprising:
a processor configured to function as:
a recognizing part to recognize a position and surroundings of a vehicle per se; and
a control part to automatically control an automatic driving of at least one of acceleration and deceleration and steering of the vehicle per se, and determine whether a starting condition containing that the vehicle per se has passed by a preset passing location is met by referring to the position and surroundings of the vehicle per se recognized by the recognizing part, and start the automatic driving when determining that the starting condition is met; and
a sensor, detecting a speed of the vehicle per se, and
the starting condition contains that the speed of the vehicle per se detected by the sensor is faster than a set speed.

2. The vehicle control system according to claim 1, wherein:
the starting condition contains that the vehicle per se passes by preset multiple passing locations in sequence.

3. The vehicle control system according to claim 2, comprising:
a display device, outputting information, and
the control part controls the display device to output information representing the starting condition and/or a found state of the starting condition.

4. The vehicle control system according to claim 2, wherein the processor is configured to function as:
a proficiency speculating part to speculate a proficiency of a vehicle passenger who drives when the automatic driving is not performed, and
the higher the proficiency speculated by the proficiency speculating part, the looser the starting condition set by the control part.

5. The vehicle control system according to claim 1, comprising:
a display device, outputting information, and
the control part controls the display device to output information representing the starting condition and/or a found state of the starting condition.

6. The vehicle control system according to claim 5, wherein the processor is configured to function as:
a proficiency speculating part to speculate a proficiency of a vehicle passenger who drives when the automatic driving is not performed, and
the higher the proficiency speculated by the proficiency speculating part, the looser the starting condition set by the control part.

7. The vehicle control system according to claim 1, wherein the processor is configured to function as:
a proficiency speculating part to speculate a proficiency of a vehicle passenger who drives when the automatic driving is not performed, and
the higher the proficiency speculated by the proficiency speculating part, the looser the starting condition set by the control part.

8. The vehicle control system according to claim 7, comprising:
an interface, accepting an operation of the vehicle passenger, and
the proficiency speculating part speculates the proficiency of the vehicle passenger based on a reaction of the vehicle passenger when the vehicle passenger operates according to operation demands related to the automatic driving.

9. The vehicle control system according to claim 8, that the proficiency speculating part speculates the proficiency of the vehicle passenger based on the number of times of automatic driving by the control part.

10. The vehicle control system according to claim 7, that the proficiency speculating part speculates the proficiency of the vehicle passenger based on the number of times of automatic driving by the control part.

11. The vehicle control system according to claim 1, wherein:
the control part starts the automatic driving based on a fact whether the starting condition is met when a destination to be reached by the vehicle per se is set.

12. The vehicle control system according to claim 1, comprising:
an interface, accepting an operation of the vehicle passenger, and
the control part starts the automatic driving based on a fact whether the starting condition is met when the interface allows an operation of starting the automatic driving based on the fact whether the starting condition is met.

13. The vehicle control system according to claim 12, comprising
a display device, outputting information,
the interface accepts an operation that the vehicle passenger sets a destination, and
the control part controls the display device to output information inquiring whether the automatic drive is allowed to be started based on a fact that whether the starting condition is met when the interface accepts the operation of setting the destination.

14. The vehicle control system according to claim 1, comprising:
an interface accepting an operation of vehicle passenger, and
the control part changes the starting condition when the interface performs an operation of changing the starting condition.

15. The vehicle control system according to claim 1, comprising:
a display device, outputting information, and
the control part controls the display device to output information representing the starting condition and/or a found state of the starting condition.

16. The vehicle control system according to claim 1, wherein the processor is configured to function as:
a proficiency speculating part to speculate a proficiency of a vehicle passenger who drives when the automatic driving is not performed, and
the higher the proficiency speculated by the proficiency speculating part, the looser the starting condition set by the control part.

17. A vehicle control method, wherein
a vehicle-mounted computer recognizes a position and surroundings of a vehicle per se, determines whether a starting condition containing that the vehicle per se has passed by a preset passing location is met based on the recognized position and surroundings of the vehicle per se, and starts automatic driving of at least one of acceleration and deceleration and steering when determining that the starting condition is met, wherein the starting condition contains that a speed of the vehicle per se is faster than a set speed.

18. A non-transitory computer-readable recording medium comprising a vehicle control program, causing a vehicle-mounted computer to recognize a position and surroundings of a vehicle per se, to determine whether a starting condition containing that the vehicle per se has passed by a preset passing location is met based on the recognized position and surroundings of the vehicle per se, and to start automatic driving of at least one of acceleration and deceleration and steering when determining that the starting condition is met, wherein the starting condition contains that a speed of the vehicle per se is faster than a set speed.

\* \* \* \* \*